US009674701B2

(12) United States Patent
Kim et al.

(10) Patent No.: US 9,674,701 B2
(45) Date of Patent: Jun. 6, 2017

(54) METHOD AND APPARATUS FOR CONTROLLING ACCESS TO LOCATION INFORMATION ABOUT USER EQUIPMENT EXECUTING APPLICATION

(71) Applicant: Samsung Electronics Co., Ltd, Gyeonggi-do (KR)

(72) Inventors: Jin-Hyoung Kim, Seoul (KR); Hyeon-Jin Kang, Seoul (KR); Yong-Seok Park, Seoul (KR); Kang-Jin Yoon, Seoul (KR); Jin-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 14/692,852

(22) Filed: Apr. 22, 2015

(65) Prior Publication Data

US 2015/0304848 A1 Oct. 22, 2015

(30) Foreign Application Priority Data

Apr. 22, 2014 (KR) ........................ 10-2014-0048132

(51) Int. Cl.
| | | |
|---|---|---|
| *H04M 1/66* | (2006.01) | |
| *H04W 12/06* | (2009.01) | |
| *H04W 4/02* | (2009.01) | |
| *H04W 12/08* | (2009.01) | |
| *G06F 21/62* | (2013.01) | |

(Continued)

(52) U.S. Cl.
CPC ........ *H04W 12/06* (2013.01); *G06F 21/6245* (2013.01); *H04M 1/72572* (2013.01); *H04W 4/025* (2013.01); *H04W 12/08* (2013.01); *G06F 2221/2111* (2013.01); *H04M 1/67* (2013.01); *H04W 4/02* (2013.01)

(58) Field of Classification Search
CPC ..... H04W 12/06; H04W 4/005; H04W 4/025; H04W 12/08; H04W 4/02; G06F 21/6245; G06F 2221/2111; H04M 1/66; H04M 1/67; H04M 1/72572
USPC ...................... 455/411, 456.1, 437
See application file for complete search history.

(56) References Cited

U.S. PATENT DOCUMENTS

| | | | |
|---|---|---|---|
| 8,656,465 B1 * | 2/2014 | Fong-Jones | ......... G06F 21/6281 713/165 |
| 9,286,450 B2 * | 3/2016 | Grigg | ...................... G06F 21/31 |

(Continued)

*Primary Examiner* — Mong-Thuy Tran

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method and a User Equipment (UE) for controlling access to location information about the UE are provided. The UE includes a controller configured, upon sensing access to the location information about the UE by an application operating in an operating system (OS) of the UE, to match a rule defining access authorization of the application to the location information, and to determine whether to allow or deny access of the application to the location information based on the access authorization, and a display configured to display a screen under control of the controller.

18 Claims, 8 Drawing Sheets

(51) Int. Cl.
  *H04M 1/725* (2006.01)
  *H04M 1/67* (2006.01)

(56) References Cited

U.S. PATENT DOCUMENTS

| | | | | |
|---|---|---|---|---|
| 9,305,149 B2* | 4/2016 | Grigg | | H04L 63/083 |
| 2003/0105864 A1* | 6/2003 | Mulligan | | H04L 12/1859 |
| | | | | 709/225 |
| 2006/0223518 A1* | 10/2006 | Haney | | H04W 12/08 |
| | | | | 455/420 |
| 2008/0070593 A1* | 3/2008 | Altman | | H04L 63/102 |
| | | | | 455/457 |
| 2011/0060807 A1* | 3/2011 | Martin | | G06F 17/3087 |
| | | | | 709/217 |
| 2011/0137814 A1* | 6/2011 | Stewart | | G06Q 50/01 |
| | | | | 705/319 |
| 2011/0173545 A1* | 7/2011 | Meola | | G06F 21/6218 |
| | | | | 715/743 |
| 2012/0144452 A1* | 6/2012 | Dyor | | H04L 63/0884 |
| | | | | 726/4 |
| 2012/0220314 A1* | 8/2012 | Altman | | G06Q 30/0207 |
| | | | | 455/456.3 |
| 2013/0281112 A1 | 10/2013 | Sabatelli et al. | | |
| 2014/0032691 A1* | 1/2014 | Barton | | H04L 41/00 |
| | | | | 709/206 |
| 2014/0059695 A1* | 2/2014 | Parecki | | G06F 21/60 |
| | | | | 726/26 |
| 2014/0257953 A1* | 9/2014 | Kaplan | | G06Q 30/0214 |
| | | | | 705/14.16 |
| 2014/0282862 A1* | 9/2014 | Persson | | H04L 63/10 |
| | | | | 726/1 |
| 2015/0120572 A1* | 4/2015 | Slade | | G06Q 20/3223 |
| | | | | 705/73 |
| 2015/0242621 A1* | 8/2015 | Jackson | | G06F 21/6281 |
| | | | | 726/17 |

* cited by examiner

METHOD AND APPARATUS FOR CONTROLLING ACCESS TO LOCATION INFORMATION ABOUT USER EQUIPMENT EXECUTING APPLICATION

CROSS-REFERENCE TO RELATED APPLICATION AND CLAIM OF PRIORITY

The present application is related to and claims the benefit under 35 §119(a) of a Korean patent application filed in the Korean Intellectual Property Office on Apr. 22, 2014 and assigned Serial No. 10-2014-0048132, the entire disclosure of which is incorporated herein by reference.

TECHNICAL HELD

The present disclosure relates generally to a method and apparatus for controlling access to location information about a User Equipment (UE), and more particularly, to a method and apparatus for controlling access to location information about a UE capable of executing an application, such as a smart device.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create anew value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Owing to the recent dramatic development of information and communication technology and hardware/software technology for mobile communication terminals, various types of terminals such as mobile communication terminal, Personal Computer (PC), and the like are configured to execute various functions (programs or applications) through a high-speed mobile communication network. Particularly, smart devices such as 'smartphone' and 'tablet PC' are popular. A variety of applications can be installed or deleted freely in a smart device.

Applications installed in a smartphone acquire and use location information. For example, a specific application of a UE can acquire location information about the UE and transmit the location information to a server of a network and the server provides a service based on the location information about the UE. However, since the location history of the UE is stored. in the server, the location of a user may be disclosed unintentionally. Because other personal information can be derived from the location information, the location information about the user (that is, the UE) is important information requiring security rather than simple location information.

However, users are not aware on the whole that various applications acquire their location information and their personal information can be disclosed from the location information. When an application is installed, a conventional smartphone notifies a user that the application acquires the user's location information or displays a query asking the user whether to allow the application to acquire the location information, on a User Interface (UI). However, since the notification or query regarding location information acquisition is one of mandatory steps for application installation, users tend not to pay proper attention to the notification or query.

Moreover, with (not specific application-level control but) Operating System (OS)-level control of access to location information about a UE or control of access to location information at the moment of installing an application, various environments that may be generated during execution of the application are not coped with appropriately as well as the characteristics of applications having various requirements for location information are not reflected.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. To address the above-discussed deficiencies, it is a primary object to provide a method and apparatus for controlling access to location information, which reflects characteristics of applications having various requirements or appropriately copes with an environment change of a user executing an application.

Another aspect of the present disclosure is to provide a method and apparatus for, when a user does not want disclosure of his or her location information, restricting access to the location information and facilitating settings regarding the location information in various cases of using applications.

Another aspect of the present disclosure is to provide a method and apparatus for controlling access to location information on an application basis.

Another aspect of the present disclosure is to provide a User Interface (UI) for setting whether to allow access to location information according to an environment change of a User Equipment (UE) or a user.

Another aspect of the present disclosure is to provide a UI for setting location information access, which enables immediate handling of an attempt to access to location information during execution of an application.

In accordance with an aspect of the present disclosure, a User Equipment (UE) is provided for controlling access to location information about the UE. The UE includes a controller configured, upon sensing access to the location information about the UE by an application operating in an operating system (OS) of the UE, to match a rule defining access authorization of the application to the location information, and to determine whether to allow or deny access of the application to the location information based on the access authorization, and a display configured to display a screen under control of the controller.

In accordance with another aspect of the present disclosure, a UE is provided for controlling access to location information about the UE. The UE includes a controller configured, upon sensing access to the location information about the UE by an application operating in an OS of the UE, to match a rule defining access authorization of the application to the location information, and to determine whether to allow or deny access of the application to the location information based on the access authorization, and a display configured to display a screen under control of the controller. In the absence of the rule, the controller controls the display to output a notification indicating an attempt of the application to access the location information.

In accordance with another aspect of the present disclosure, a method is provided for controlling access to location information about a UE, performed by the UE. The method includes, upon sensing access to the location information about the UE by an application operating in an OS of the UE, matching a rule defining access authorization of the application to the location information, and determining whether to allow or deny access of the application to the location information based on the access authorization.

In accordance with another aspect of the present disclosure, a method is provided for controlling access to location information about a UE, performed by the UE. The method includes, upon sensing access to the location information about the UE by an application operating in an OS of the matching a rule defining access authorization of the application to the location information, and determining whether to allow or deny access of the application to the location information based on the access authorization. In the absence of the rule, the method further includes outputting a notification indicating an attempt of the application to access the location information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
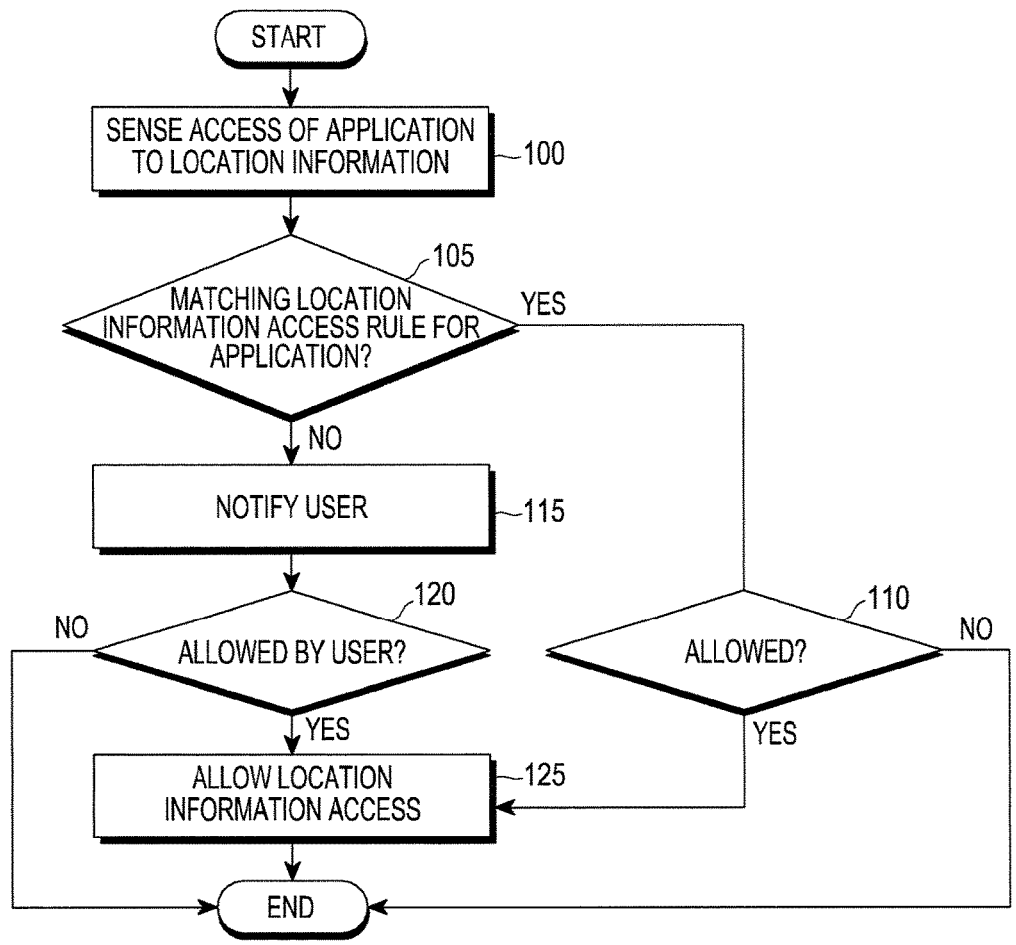
FIG. 1 illustrates a method for controlling access to location information about a User Equipment (UE) according to various embodiments of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A User Equipment (UE) is a device capable of executing an application. The term 'UE' can be replaced with 'Mobile Station (MS),' 'Mobile Equipment (ME),' 'device,' 'terminal,' or the like. For example, a UE is a portable terminal such as a smartphone or a tablet Personal Computer (PC) or a terminal such as a desktop computer or a laptop computer.

The present disclosure provides a method for controlling access to location information in a UE that executes an application. An application, which is also called app, refers to a program operating in an Operating System (OS) of a UE such as a smartphone. The OS of the UE is, for example, iOS of APPLE, ANDRIOD of GOOGLE, WINDOWS PHONE of MICROSOFT, or SYMBIAN.

To offer use convenience in regard to control of an application's access to location information, acquisition (and sharing) of location information about a UE can be automatically restricted according to a predetermined decision condition. Specifically, a user creates a location information access rule using the spatial range of the UE (for example, an arbitrary point from a current location or a distance to the UE or a person), a time zone, and the user's activity or event (scheduling information about the UE, such as a conference or appointment) in combination, and access to location information is allowed or denied according to the rule.

However, this method causes user inconvenience in that the user should create the rule in advance and if the user wants or does not want to share the location information (without following the current rule), the user should directly enable or disable the location sharing function of an OS or an application.

Moreover, access of a specific application to location information may not be controlled because there is no specified method for controlling access to location information on an application basis. For example, if access to mobility information about a UE is restricted at an OS level, even an application requiring acquisition of the mobility information, such as a navigation application is not executed normally.

The present disclosure provides a method for determining whether an application executed in a UE is authorized to access location information about the UE each time the application attempts to access the location information and, when needed, providing a user with a notification so that the application may access the location information based on the user's selection.

FIG. 1 illustrates a method for controlling access to location information about a UE according to various embodiments of the present disclosure.

In step 105, when the UE (an OS or a controller operating the OS in the UE) senses access of an application to location information in step 100, the UE determines whether there is a rule that defines access authorization of the application for the location information (that is, a matching 'location information access rule'). The UE uses application identification information in determining the presence of the location information access rule. Optionally, the UE further uses at least one of location information, time information, event information, application state information, and LIE state information in determining the presence of the location information access rule. For example, the UE determines whether there is a rule matching an identifier (ID) of the application, a current location, and a current time among stored rules.

TABLE 1

| App ID | Location | Time | Allow or Deny |
|--------|----------|-------|---------------|
| 0001 | location 1 | 11:00 | N |
| 0001 | location 2 | 12:00 | Y |

TABLE 1-continued

| App ID | Location | Time | Allow or Deny |
|---|---|---|---|
| 0001 | location 3 | 13:00 | Y |
| 0001 | location 4 | 17:00 | Y |

[Table 1] illustrates an exemplary data structure of a location information access rule that is stored in the UE. While the location information access rule specifies App ID, location information, time information, and 'Allow' or 'Deny' in [Table 1], all information except for App ID and 'Allow' or 'Deny' may be selectively included.

In step 110, in the presence of the matching location information access rule for the application in step 105, the UE determines whether the location information access rule indicates 'Allow'.

In step 125, when the location information access rule indicates 'Allow' in step 110, the UE allows the application to access the location information in step 125. In certain embodiments, the UE provides the location information directly to the application.

When the location information access rule does not indicate 'Allow' in step 110, the UE ignores or blocks the attempt of the application to access the location information and does not perform any further operation.

In step 115, in the absence of the matching location information access rule for the application in step 105, the UE notifies a user of the attempt of the application to the location information. The UE outputs an icon in a notification bar or a pop-up window querying about whether to allow the access to location information.

In step 125, when the user selects to allow the access to the location information in step 115, the UE allows the application to access the location information. In certain embodiments, the UE provides the location information directly to the application.

When the user does not select to allow the access to the location information in step 120, the UE ignores (blocks) the attempt of the application to access the location information.

When the user selects to allow the application to access the location information in step 120, the UE generates a new rule for the application, which indicates 'Allow' or 'Deny' in regard to location information access of the application. The new rule may include information about the application and information indicating 'Allow' or 'Deny' regarding access to the location information. This rule is used as a criterion based on which it is determined whether to allow later access of the application to location information. The rule further includes, as additional information, at least one of current location information about the UE, current time information, current event information, application state information, and UE state information. The UE determines whether to allow or deny access of the application to the location information based on the additional information.

The flowchart illustrated in FIG. 1 includes all steps needed to describe all possible embodiments of the present disclosure. Therefore, it is to be understood that it is not necessary to perform all of the steps in implementing the present disclosure.

FIGS. 2A to 2H illustrate exemplary UIs through which a UE asks a user whether to allow access of an application to location information and generates a rule, upon sensing the access of the application to the location information, according to various embodiments of the present disclosure.

Figure 2A:
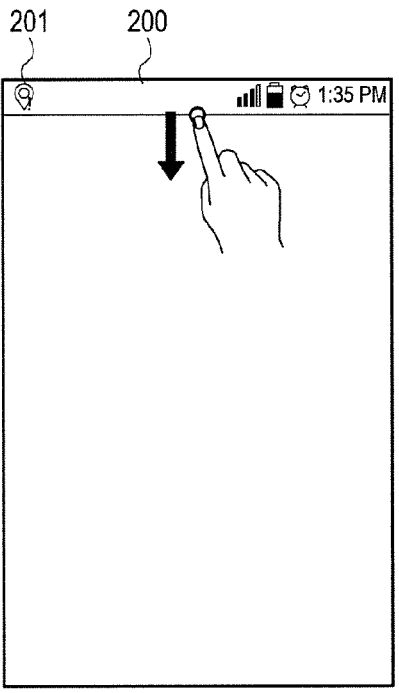
FIG. 2A illustrates an exemplary screen that indicates an attempt of an application to access location information by a notification bar in a UE according to various embodiments of the present disclosure.

FIG. 2A illustrates a screen on which a UE notifies a user of an attempt of an application to access location information by a notification bar according to various embodiments of the present disclosure.

Referring to FIG. 2A, when the UE (an OS or a controller operating the OS in the UE) senses an attempt of an application to access location information, the UE provides a notification to a user by outputting an icon (for example, a tack-shaped icon) 201 in a notification bar 200 displayed at a part of a screen displayed on a display. The user can immediately deal with the attempt of the application to access the location information during execution of the application.

When the user views the icon 201, the user moves to a location information access control screen by drawing down the notification bar 200. When the user does not want disclosure of his or her location information, the user restricts access to the location information and otherwise, the user allows access to the location information.

Figure 2B:
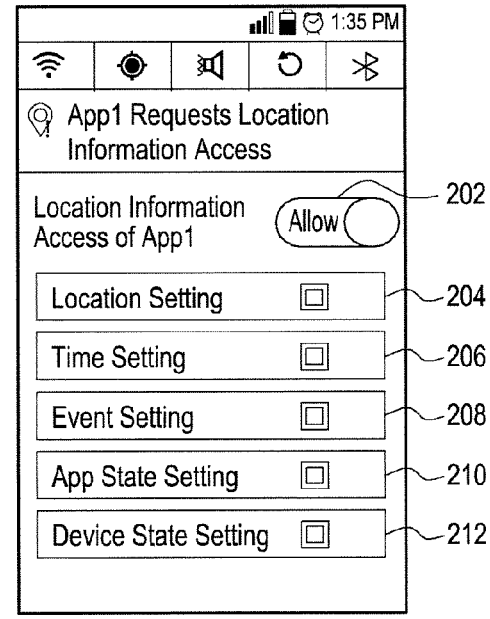
FIG. 2B illustrates a screen that, when an application is sensed as attempting to access location information, notifies a user of the access attempt according to various embodiments of the present disclosure.

FIG. 2B illustrates a screen for controlling access of an application to location information, when the application is sensed as attempting to access the location information according to various embodiments of the present disclosure.

Referring to FIG. 2B, the control screen includes a plurality of elements by which to set 'Allow' or 'Deny' regarding location information access of a specific application (for example, 'App1'). The control screen includes a button 202 that toggles between 'Allow' and 'Deny' for location information access. The control screen further includes additional setting menus 204, 206, 208, 210, and 212 related to additional information that can be used as criteria based on which it is determined whether to allow location information access. Specifically, the control screen includes a 'Location setting' menu 204 for setting whether to allow location information access using location information as a condition, a 'Time setting' menu 206 for setting whether to allow location information access using time information as a condition, an 'Event setting' menu 208 for setting whether to allow location information access using scheduled event information of a user as a condition, an 'App state setting' menu 210 for setting whether to allow location information access using state information about the application as a condition, and a 'Device state setting' menu 212 for setting whether to allow location information access using state information about the UE as a condition.

The user can set 'Allow' or 'Deny' for the location information access of the specific application (that is, 'App1'). In FIG. 2B, the toggling button 202 is set to 'Allow,' by way of example. In certain embodiments, the user creates or modifies a rule so that the specific application can be allowed to access the location information access.

The user creates a rule that defines 'Allow' for location information access when specific conditions are satisfied by additionally selecting one or more of the additional setting menus 204, 206, 208, 210, and 212. The selected one or more additional setting menus are conditions that should all be satisfied along with identification information about the application. The selected one or more additional setting menus are placed in an 'AND' relationship. For example, when the 'Location setting' menu 204 and the 'Time setting' menu 206 are selected, the application accesses the location information only when the LE is located at a location and time set as access allow conditions.

Figure 2C:
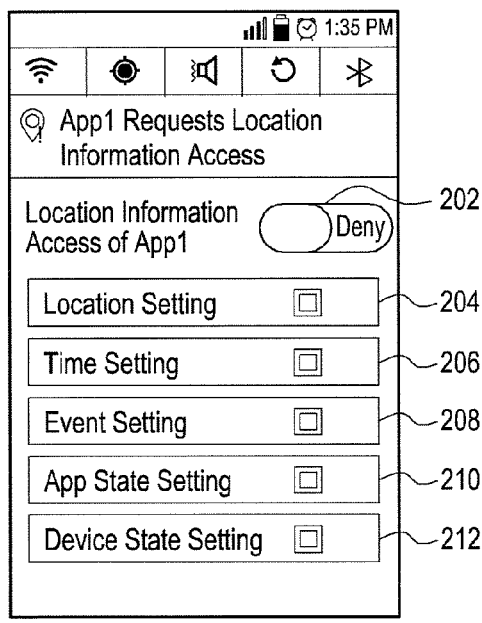
FIG. 2C illustrates a screen that, when an application is sensed as attempting to access location information, notifies a user of the access attempt according to various embodiments of the present disclosure.

FIG. 2C illustrates a screen for controlling access of an application to location information, when the application is sensed as attempting to access the location information according to various embodiments of the present disclosure.

Referring to FIG. 2C, the control screen includes the same elements as the control screen illustrated in FIG. 2B, except that the toggling button 202 is set to 'Deny.' In certain embodiments, the user creates or modifies a rule so that location information access is denied for the specific application.

The user creates or modifies a rule so that 'Deny' is defined for location information access, when specific conditions are satisfied by additionally selecting one or more of the additional setting menus 204, 206, 208, 210, and 212. The selected one or more additional setting menus are conditions that should all be satisfied along with identification information about the application. That is, the selected one or more additional setting menus are placed in an 'AND' relationship. For example, if the 'Location setting' menu 204 and the 'Time setting' menu 206 are selected, the application may not be allowed to access the location information when the UE is located at a location and time set as access deny conditions.

While the following description is given on the assumption that location information access is 'allowed' as in FIG. 2B, the same thing applies to the case where location information access is 'denied' as in FIG. 2C.

Figure 2D:
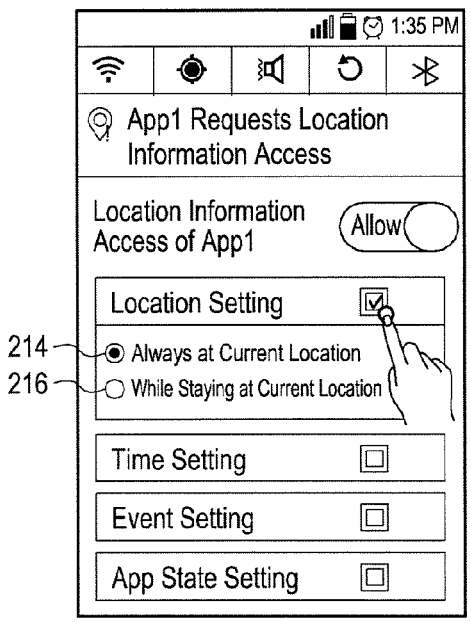
FIG. 2D illustrates a screen for controlling access to location information using a location condition, when an application is sensed as attempting to access location information according to various embodiments of the present disclosure.

FIG. 2D illustrates a screen for controlling access to location information using a location condition, when an application is sensed as attempting to access location information according to various embodiments of the present disclosure.

When location information is used as an access allow condition, for example, two options are available. The options are, for example, an "always at current location" option 214 and a "while staying at current location" option 216. The "always at current location" option 214 allows access of a specific application to location information, when the UE is located at a point determined as a current location, irrespective of a date. The "while staying at current location" option 216 does not allow the application to access location information when the UE moves out of the current location and then returns to the current location.

The 'current location' is an area within a predetermined threshold distance from a current location which has been set when the UE sets the access allow condition. For example, the UE determines an area within a radius of 100 m or 500 m from a point determined as a current location to correspond to 'the current location.'

Figure 2E:
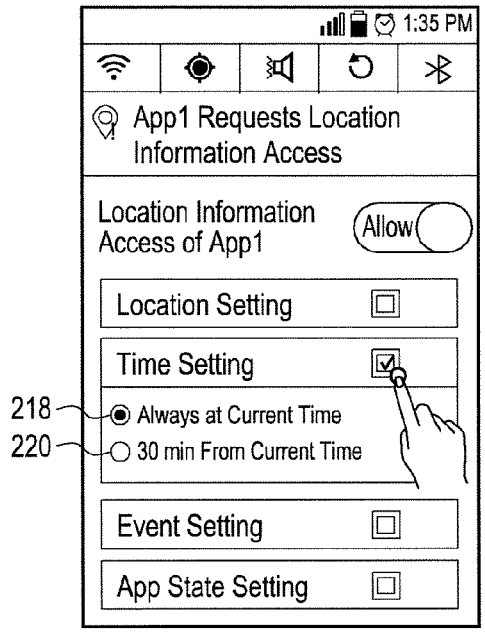
FIG. 2E illustrates a screen for controlling access to location information using a time condition, when an application is sensed as attempting to access location information according to various embodiments of the present disclosure.

FIG. 2E illustrates a screen for controlling access to location information using a time condition, when an application is sensed as attempting to access location information according to various embodiments of the present disclosure.

When time information is used as an access allow condition, for example, two options are available. The options are, for example, an "always at current time" option 218 and a "for 30 min from current time" option 220. The "always at current time" option 218 allows access of a specific application to location information irrespective of a date, during a time determined as 'the current time' in the day.

The 'current time' is a time period within a predetermined threshold time from a 'current time' which has been determined when the UE sets the access allow condition. For example, the UE determines a time period spanning 5 minutes before and after a time determined as a current time to correspond to 'the current time.'

The above-described 30 min and 5 min are merely exemplary. Accordingly, other time values are applicable according to specific embodiments.

Figure 2F:
FIG. 2F illustrates a screen for controlling access to location information using an event condition, when an application is sensed as attempting to access location information according to various embodiments of the present disclosure.

FIG. 2F illustrates a screen for controlling access to location information using an event condition, when an application is sensed as attempting to access location information according to various embodiments of the present disclosure.

When event information is used as an access allow condition, for example, two options are available. The options are, for example, an "always during conference" option 222 and an "always during travel" option 224. The "always during conference" option 222 allows access of a specific application to location information, only when a current event is a 'conference.'

An event such as 'conference' or 'travel' is an event set in a schedule management application or the like by the user. The location information access control screen of the present disclosure acquires event information in conjunction with the schedule management application of the UE and determines whether to allow or deny access or create or modify a rule to allow location information access, using the acquired event information.

Figure 2G:
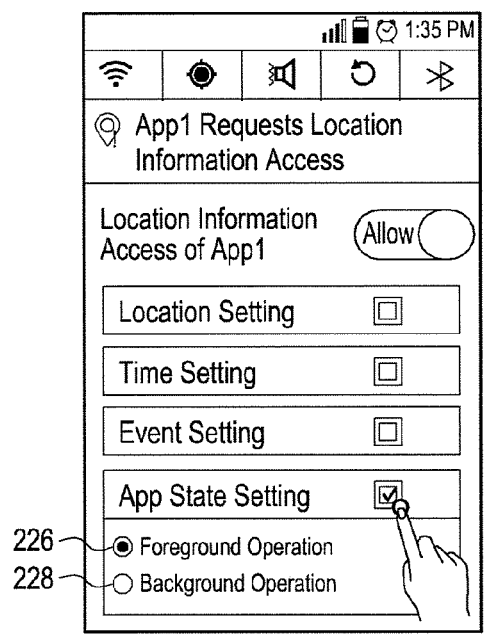
FIG. 2G illustrates a screen for controlling access to location information using an application state condition, when an application is sensed as attempting to access location information according to various embodiments of the present disclosure.

FIG. 2G illustrates a screen for controlling location information access using an application state condition, when an application is sensed as attempting to access location information according to various embodiments of the present disclosure.

If application state information is used as an access allow condition, for example, two options are available. The options are, for example, a "foreground operation" option 226 and a "background operation" option 228. The "foreground operation" option 226 allows access of a specific application to location information when the specific application operates in a displayed state (that is, a foreground state). The "background operation" option 228 allows access of a specific application to location information when the specific application operates in the background although it is not displayed on a display.

Figure 2H:
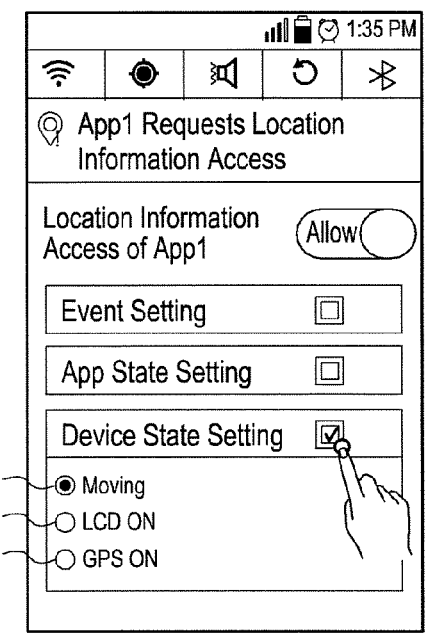
FIG. 2H illustrates a screen for controlling access to location information using a UE state condition, when an application is sensed as attempting to access location information according to various embodiments of the present disclosure.

FIG. 2H illustrates a screen for controlling access to location information using a UE state condition when an application is sensed as attempting to access location information according to various embodiments of the present disclosure.

When UE state information is used as an access allow condition, for example, three options are available. The options are, for example, a "moving" option 230, an "LCD ON" option 232, and a "GPS ON" option 234. The "moving" option 230 allows access of a specific application to location information, only during movement of the UE. The "LCD ON" option 232 allows access of a specific application to location information when a display (for example, a Liquid Crystal Display (LCD) unit) of the UE is turned on and is displaying a screen. The "GPS ON" option 234 allows access of a specific application to location information when a Global Positioning System (GPS) unit of the UE is operating.

The user sets whether to allow or deny access that a specific application attempts to current location information by use of a location information access control screen provided by the UE and generates or modifies a rule using an access allow condition.

FIGS. 3A to 3J are exemplary views illustrating UIs for controlling location information access of an application and managing a location information access rule, using a map according to various embodiments of the present disclosure.

Figure 3A:
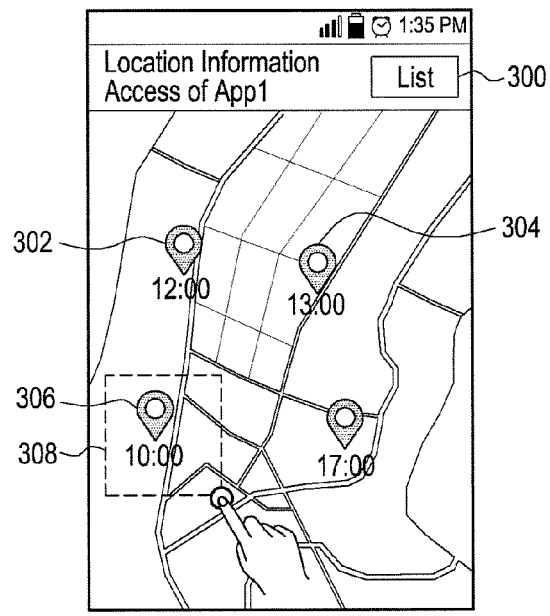
FIG. 3A illustrates a screen that displays a location information access history of an application on a map according to various embodiments of the present disclosure.

FIG. 3A illustrates a screen that displays a location information access history of a specific application on a map according to various embodiments of the present disclosure.

When the UE senses that the specific application accesses location information (FIG. 2A) and the user draws down a notification bar or selects the specific application on an application-based location information access control screen, the screen illustrated in FIG. 3A is output. An icon indicating the current location of the UE is displayed on the map.

Referring to FIG. 3A, the UE outputs a map on which icons (for example, tack-shaped icons) are arranged at specific locations. The map indicates 'Allow' or 'Deny' for location information access of 'App1' at time points displayed with the icons at the points indicated by the icons. For example, an icon 302 indicates that the application accessed location information at 12:00, an icon 304 indicates that the application accessed location information at 13:00, and an icon 306 indicates that the application accessed location information at 10:00. A point at which the application attempted but was not allowed to access location information is indicated by setting the shape or color of an icon corresponding to the point.

The screen of FIG. 3A includes a 'List' button 300. The button 300 includes a link to another screen. Upon selection of the button 300, for example, a screen that displays a list of applications available for control of location information access or a screen that displays a list of locations at which 'App1' has accessed location information is output.

The user selects one or more icons by a touch 308 which is made on an icon indicating a point or dragged around the icon on a screen. Permission or denial of access to location information at points indicated by the selected icons be controlled as described below with reference to FIGS. 3B to 3J.

Figure 3B:
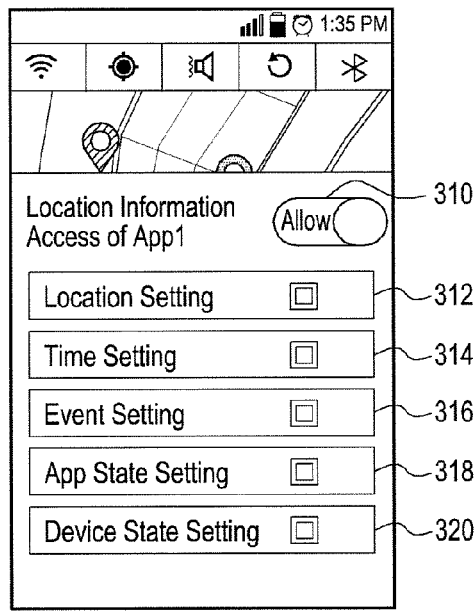
FIG. 3B illustrates a screen for controlling access of an application to location information, for a point selected on a map according to various embodiments of the present disclosure.

FIG. 3B illustrates a screen for controlling access of an application to location information, for a point selected on a map according to various embodiments of the present disclosure.

The control screen of FIG. 3B includes a plurality of elements by which to set 'Allow' or 'Deny' for location information access of a specific application (for example, 'App1'), for the points selected in FIG. 3A. The control screen includes a button 310 that toggles between 'Allow' and 'Deny' for location information access. The control screen further includes additional setting menus 312, 314, 316, 318, and 320 related to additional information that are used as rules for determining whether to allow or deny location information access. The control screen includes the 'Location setting' menu 312 that sets 'Allow' or 'Deny' using location information as a condition, the 'Time setting' menu 314 that sets 'Allow' or 'Deny' using time information as a condition, the 'Event setting' menu 316 that sets 'Allow' or 'Deny' using scheduled event information of a user as a condition, the 'App state setting' menu 318 that sets 'Allow' or 'Deny' using application state information as a condition, and the 'Device state setting' menu 320 that sets 'Allow' or 'Deny' using UE state information as a condition.

The user set 'Allow' or 'Deny' for location information access of the specific application ('App1'). In FIG. 3B, the toggling button 310 is set to 'Allow', by way of example. In certain embodiments, the user generates or changes a rule to 'Allow' location information access of the specific application.

The user creates a rule that defines 'Allow' for location information access, if specific conditions are satisfied by additionally selecting one or more of the additional setting menus 312, 314, 316, 318, and 320. The selected one or more additional setting menus are conditions that should all be satisfied along with identification information about the application. The selected one or more additional setting menus are placed in an 'AND' relationship. For example, if the 'Location setting' menu 312 and the 'Time setting' menu 314 are selected, the application accesses the location information when the UE is located at a location and time set as access allow conditions.

Figure 3C:
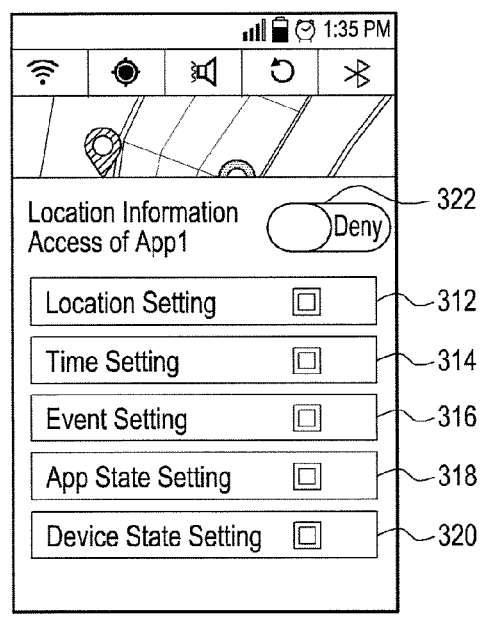
FIG. 3C illustrates a screen for controlling access of an application to location information, for a point selected on a map according to various embodiments of the present disclosure.

FIG. 3C illustrates a screen for controlling access of an application to location information, for a point selected on a map according to various embodiments of the present disclosure.

Referring to FIG. 3C, the control screen includes the same elements as the control screen illustrated in FIG. 3B, except that a toggling button 322 is set to 'Deny'. In certain embodiments, the user creates or modifies a rule so that the location information access of the specific application is denied.

The user creates or modifies a rule to define 'Deny' for location information access, if specific conditions are satisfied by additionally selecting one or more of the additional setting menus 312, 314, 316, 318, and 320. The selected one or more additional setting menus are conditions that should all be satisfied along with identification information about the application. The selected one or more additional setting menus are placed in an 'AND' relationship. For example, if the 'Location setting' menu 312 and the 'Time setting' menu 314 are selected, the application may not be allowed to access the location information when the LIE is located at a location and time set as access deny conditions.

While the following description is given on the assumption that location information access is 'allowed' as in FIG. 3B, the same thing applies to the case where location information access is 'denied' as in FIG. 3C.

Figure 3D:
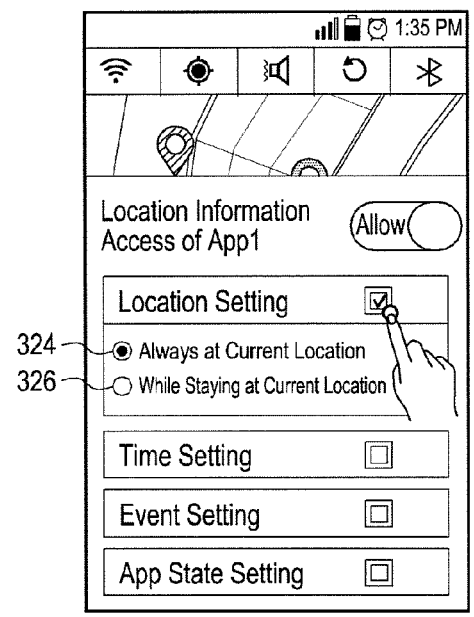
FIG. 3D illustrates a screen for controlling access to location information using a location condition, for a point selected on a map according to various embodiments of the present disclosure.

FIG. 3D illustrates a screen for controlling access to location information using a location condition, for a point selected on a map according to various embodiments of the present disclosure.

When location information is used as an access allow condition, for example, two options are available. The options re, for example, an "always at current location" option 324 and a "while staying at current location" option 326. The "always at current location" option 324 allows access of a specific application to location information when the UE is located at a point determined as a current location, irrespective of a date. The "while staying at current location" option 326 does not allow location information access when the UE moves out of the current location and then returns to the current location.

The 'current location' is an area within a predetermined threshold distance from a current location which has been determined when the UE sets the access allow condition. For example, the UE determines an area within a radius of 100 m or 500 m from a point determined as a current location to correspond to 'the current location.'

Figure 3E:
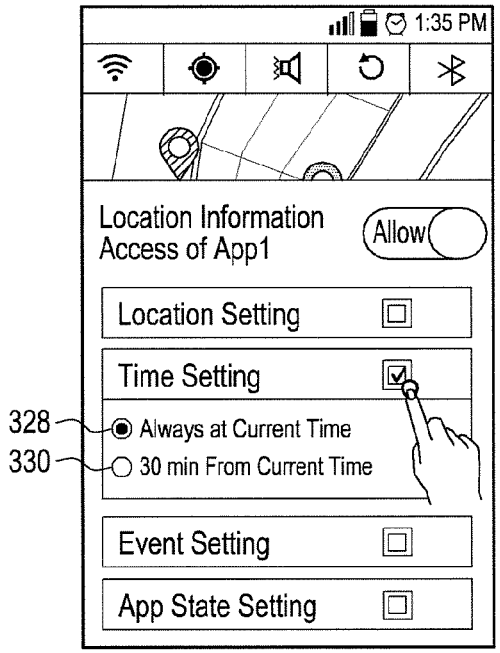
FIG. 3E illustrates a screen for controlling access to location information using a time condition, for a point selected on a map according to various embodiments of the present disclosure.

FIG. 3E illustrates a screen for controlling access to location information using a time condition, for a point selected on a map according to various embodiments of the present disclosure.

When time information is used as an access allow condition, for example, two options are available. The options are, for example, an "always at current time" option 328 and a "for 30 min from current time" option 330. The "always at the current time" option 328 allows access of a specific application to location information irrespective of a date, during a time determined as 'a current time' in the day.

The 'current time' is a time period within a predetermined threshold time from a current time which has been determined when the UE sets the access allow condition. For example, the UE determines a time period spanning 5 minutes before and after a time determined as a current time to correspond to 'the current time.'

The above-described 30 min and 5 min are merely exemplary. Accordingly, other time values are applicable according to specific embodiments.

Figure 3F:
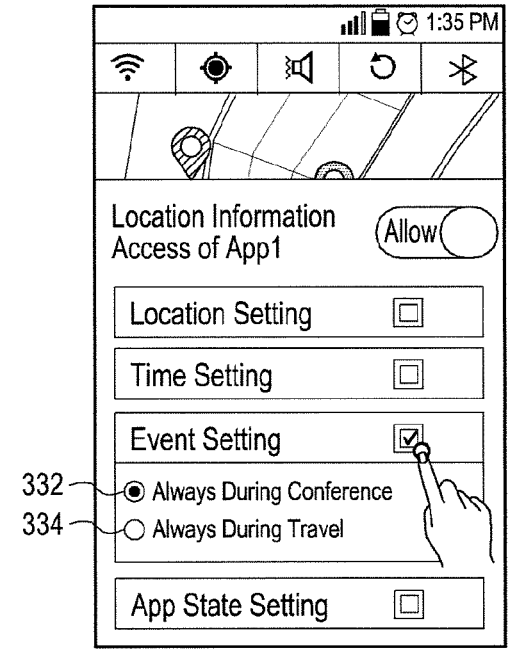
FIG. 3F illustrates a screen for controlling access to location information using an event condition, for a point selected on a map according to various embodiments of the present disclosure.

FIG. 3F illustrates a screen for controlling access to location information using an event condition, for a point selected on a map according to various embodiments of the present disclosure.

When event information is used as an access allow condition, for example, two options are available. The options are, for example, an "always during conference" option 332 and an "always during travel" option 334. The "always during conference" option 332 allows access of a specific application to location information, only when a current event is a 'conference.'

An event such as 'conference' or 'travel' is an event set in a schedule management application or the like by the user. The location information access control screen of the present disclosure acquires event information in conjunction with the schedule management application of the UE and determines whether to allow or deny access or create or modify a rule to allow access to location information, using the acquired event information.

Figure 3G:
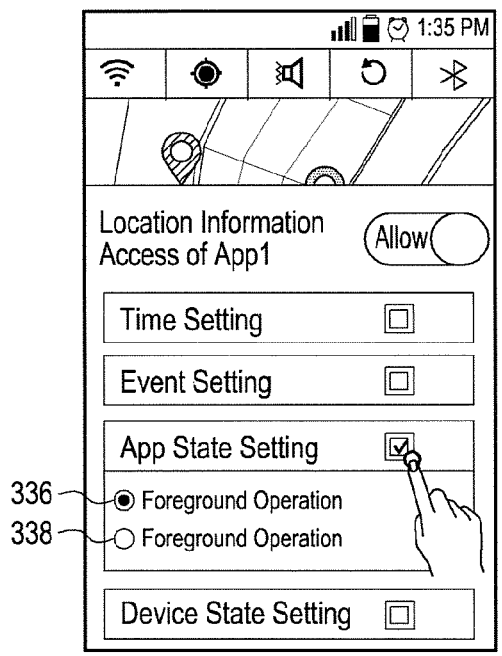
FIG. 3G illustrates a screen for controlling access to location information using an application state condition, for a point selected on a map according to various embodiments of the present disclosure.

FIG. 3G illustrates a screen for controlling access to location information using an application state condition, for a point selected on a map according to various embodiments of the present disclosure.

When application state information is used as an access allow condition, for example, two options are available. The options are, for example, a "foreground operation" option 336 and a "background operation" option 338. The "foreground operation" option 336 allows access of a specific application to location information when the specific application operates in a displayed state (that is, a foreground state). The "background operation" option 338 allows access of a specific application to location information when the specific application operates in the background although it is not displayed on a display.

Figure 3H:
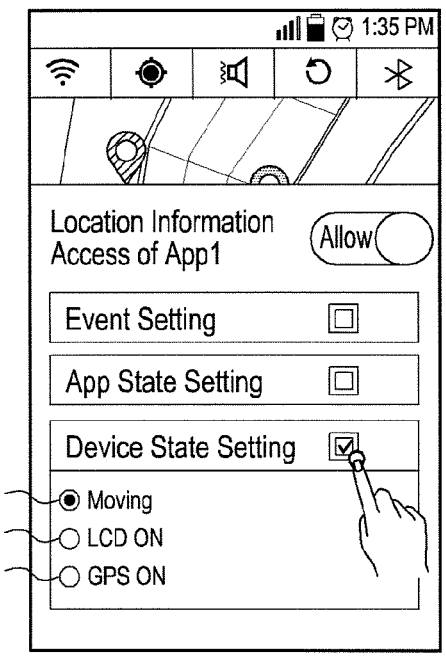
FIG. 3H illustrates a screen for controlling access to location information using a UE state condition, for a point selected on a map according to various embodiments of the present disclosure.

FIG. 3H illustrates a screen for controlling access to location information using a UE state condition for a point selected on a map according to various embodiments of the present disclosure.

When UE state information is used as an access allow condition, for example, three options are available. The options are, for example, a "moving" option 340, an "LCD ON" option 342, and a "GPS ON" option 344. The "moving" option 340 allows access of a specific application to location information, only during movement of the UE. The "LCD ON" option 342 allows access of a specific application to location information when a display (for example, an LCD unit) of the UE is turned on and is displaying a screen. The "GPS ON" option 344 allows access of a specific application to location information when a GPS unit of the UE is operating.

The user sets whether to allow or deny access that a specific application attempts to location information, for a point selected on a map, by use of a location information access control screen provided by the UE and generates or modifies a rule using an access allow condition.

Figure 3I:
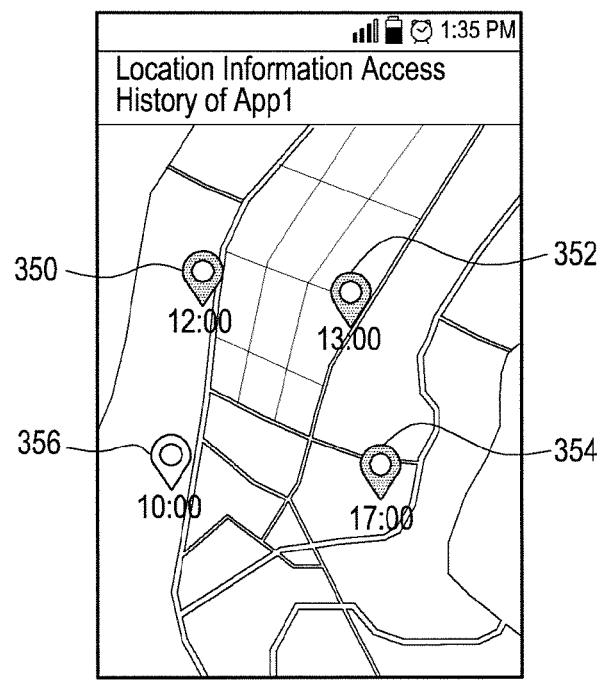
FIG. 3I illustrates a screen that displays a location information access history of a specific application on a map according to various embodiments of the present disclosure.

FIG. 3I illustrates a screen that displays a location information access history of a specific application on a map according to various embodiments of the present disclosure.

In FIG. 3I, the application is allowed to deny access location information at points indicated by icons arranged on the map by differentiating the colors of the icons. For example, shaded icons 350, 352, and 354 indicates 'Allow' for location information access of the application and a white icon 356 indicates 'Deny' for location information access of the application.

Referring to FIG. 3I, the application ('App1') accessed location information at 12:00 at a point indicated by the icon 350, at 13:00 at a point indicated by the icon 352, and at 17:00 at a point indicated by the icon 354. The application ('App1') was not allowed to access location information at 10:00 at a point indicated by the icon 356.

Figure 3J:
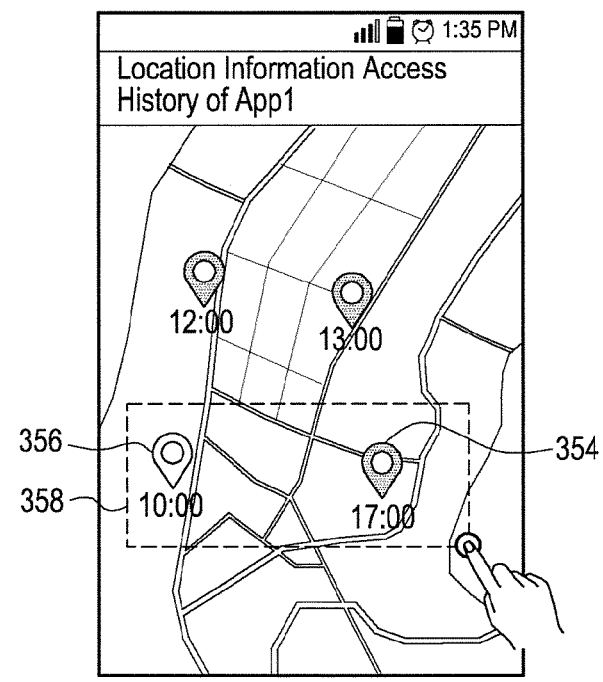
FIG. 3J illustrates a screen on which one or more points displayed on a map are selected to control access of an application to location information according to various embodiments of the present disclosure.

FIG. 3J illustrates a screen on which one or more points displayed on a map are selected to control access of an application to location information according to various embodiments of the present disclosure.

The user selects an area including one or more icons 356 and 354 displayed on the map by a drag touch 358 in order to set 'Allow' or 'Deny' for location information access of the application ('App1'). The user sets 'Allow' or 'Deny' for location information access using the control screens illustrated in FIGS. 3B to 3H with respect to the selected points.

FIGS. 4A to 4D are exemplary views illustrating UIs for setting location information access on an application basis according to various embodiments of the present disclosure.

Figure 4A:
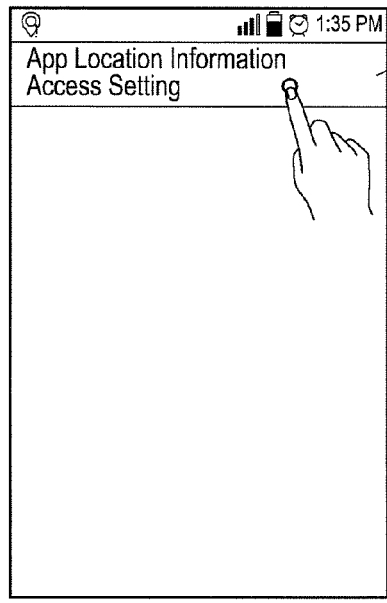
FIG. 4A illustrates a menu for setting location information access on an application basis, which is displayed in a UE according to various embodiments of the present disclosure.

FIG. 4A illustrates an application-based location information access setting menu displayed on a UE according to various embodiments of the present disclosure.

The UE (an OS or a controller operating the OS) provides a setting screen as illustrated in FIG. 4A to enable the user to control location information access on an application basis. For example, the user is provided with an application-based location information access setting screen by selecting an 'App location information access setting' menu 400.

Figure 4B:
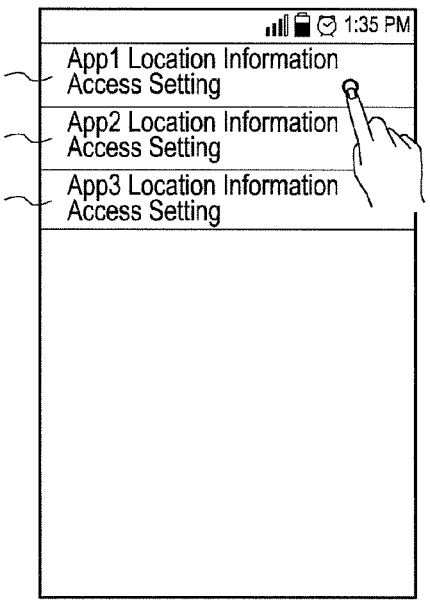
FIG. 4B illustrates a screen for setting location information access on an application basis according to various embodiments of the present disclosure.

FIG. 4B illustrates an application-based location information access setting screen according to various embodiments of the present disclosure.

Referring to FIG. 4B, the application-based location information access setting screen output a list of applications so that a user selects an application to be controlled regarding location information access. The setting screen displays an 'App1 location information access setting' menu 402, an 'App2 location information access setting' menu 404, and an 'App3 location information access setting' menu 406. For example, the user checks or changes a rule set for the specific application (that is, 'App1') by selecting the 'App1 location information access setting' menu 402.

Figure 4C:
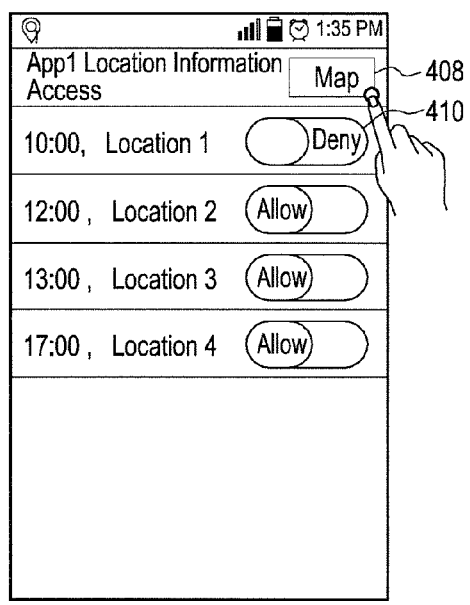
FIG. 4C illustrates a screen for checking and changing location information access settings on an application basis according to various embodiments of the present disclosure.

FIG. 4C illustrates a screen for checking and changing location information access settings on an application basis according to various embodiments of the present disclosure.

Referring to FIG. 4C, a setting check and change screen outputs a list of rules to be checked or changed, so that rules are selected from the list. The rules are created, for example, using location information and time information. In FIG. 4C, rules of accessing location information are set for 10:00, 12:00, 13:00, and 17:00 at location 1, location 2, location 3, and location 4, by way of example. For each rule, the user controls 'Allow' or 'Deny' for location information access by use of a toggling button 410.

The setting check and change screen displays a 'Map' button 408 and the user views location 1, location 2, location 3, and location 4 on the map by selecting the button 408.

Figure 4D:
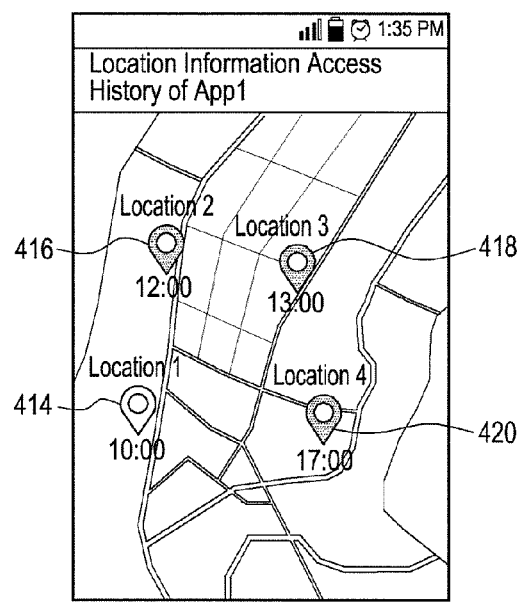
FIG. 4D illustrates a screen for checking location information access settings on an application basis using a map according to various embodiments of the present disclosure.

FIG. 4D illustrates a screen for checking location information access settings on an application basis on a map according to various embodiments of the present disclosure.

Referring to FIG. 4D, the locations (location 1, location 2, location 3, and location 4) listed in FIG. 4C are displayed on the map. Location 1, location 2, location 3, and location 4 are indicated respectively by icons 414, 416, 418, and 420.

Figure 5:
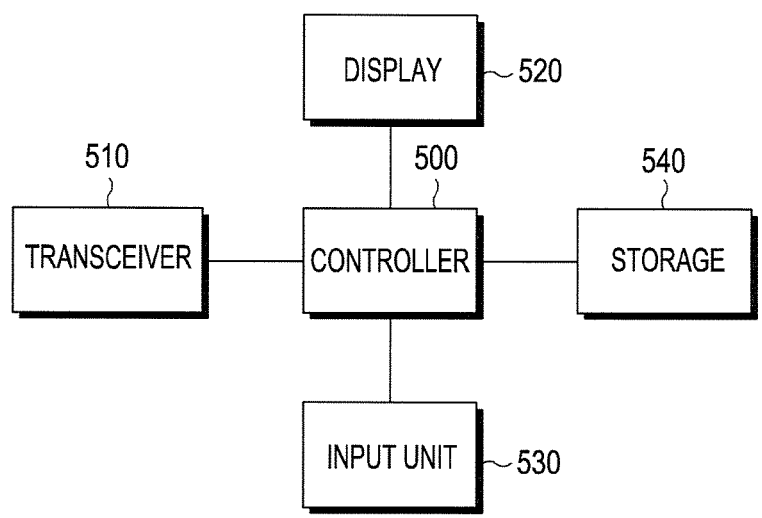
FIG. 5 illustrates a UE according to various embodiments of the present disclosure.

FIG. 5 illustrates a UE according to various embodiments of the present disclosure.

The UE includes at least one of a transceiver 510 for transmitting and receiving signals to and from a communication server or another UE through a network, a display 520 for displaying a screen, an input unit 530 for receiving information, a command, and a selection from a user, and a controller 500 for controlling operations of the transceiver 510, the display 520, and the input unit 530. The UE further includes a storage 540 for storing a location information access rule for an application.

The display 520 is configured with a touch screen that senses a user's touch, such as a Light Emitting Diode (LED) display, an LCD, a Thin Film Transistor LCD (TFT LCD), an Organic Light Emitting Diode (OLED) display, an Active Matrix OLED (AMOLED) display, a flexibly display, or a three-dimensional display. The display 520 further performs the functionality of the input unit 530. In certain embodiments, the input unit 530 may not be included as a separate component in the UE.

The input unit 530 is the same component as the display 520 or a module such as a microphone.

The controller 500 performs the above-described operations of the UE as a method for controlling location information access. The controller 500 controls at least one of sensing of location information access of an application, determination as to whether a location information access rule is present, display output for user notification, display of a user query and reception of a response, and reception of additional information to set a location information access rule.

While it has been described in FIG. 5 that the UE includes a plurality of separate components, the controller 500, the transceiver 510, and the storage 540 are incorporated into one component (or module).

The sequences of steps in the control methods, UIs, and the configuration of a UE illustrated in FIGS. 1 to 5 should not be construed as limiting the scope of the present disclosure. That is, all UI elements, UI menus, components, or steps illustrated in FIGS. 1 to 5 should not be interpreted as mandatory to implementation of the present disclosure. With a part of the components, the present disclosure is implemented without departing from the scope and spirit of the present disclosure.

As is apparent from the foregoing description, a user controls non-disclosure of unintended personal location information.

The user readily controls location information access of all applications on an application basis.

Further, since the user checks location information to be set as a rule on a map when setting location information access, the user convenience is increased during control of location information access.

The above-described operations are performed by providing a memory storing a related program code in a component of a UE in a communication system. A controller of the UE performs the above-described operations by reading the program code from the memory using a processor or a Central Processing Unit (CPU) and executing the program code.

Various components and modules of the above-described UE operates using hardware such as a hardware circuit like a complementary metal oxide semiconductor-based logic circuit, firmware, a combination of software or hardware, and a combination of firmware or software inserted into a machine-readable medium. For example, various electrical structures and methods are implemented using electrical circuits like transistors, logic gates, and Application Specific Integrated Circuits (ASICs).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) for controlling access to location information about the UE, the UE comprising:
a controller configured, upon sensing access to the location information about the UE by an application operating in an operating system (OS) of the UE, to:
match a rule defining access authorization of the application to the location information,
determine whether to allow or deny access of the application to the location information based on the access authorization, and
in an absence of the matched rule, control a display to display a notification indicating an attempt of the application to access the location information; and
the display configured to display a screen under control of the controller.

2. The UE of claim 1, wherein in a presence of the rule, the controller is further configured to allow or deny the access of the application to the location information according to the rule.

3. The UE of claim 1, wherein upon input of a user selection of the notification, the controller is further configured to control the display to output a query screen asking whether to allow or deny the access of the application to the location information.

4. The UE of claim 3, wherein the query screen includes a selection menu for at least one of location information, time information, event information, application state information, and UE state information as additional information for use in generating a rule defining whether to allow or deny the access of the application to the location information.

5. The UE of claim 4, wherein when a user selects at least one piece of additional information, the rule is generated as a condition that both selected additional information and identification information about the application should be satisfied.

6. The UE of claim 1, wherein upon input of a user selection for the notification, the controller is further configured to control the display to output a map screen including an icon indicating a current location of the UE.

7. The UE of claim 6, wherein the map screen displays a location information access history of the application using at least one icon.

8. The UE of claim 6, wherein upon input of a user selection of at least one icon on the map screen, the controller is further configured to control the display to output a screen for setting permission or denial for access of the application to location information, for a point indicated by at least one icon.

9. The UE of claim 8, wherein the screen includes a selection menu for at least one of location information, time information, event information, application state information, and UE state information as additional information for use in generating a rule defining whether to allow or deny access of the application to location information, for a point indicated by the at least one icon.

10. A method for controlling access to location information about a user equipment (UE), performed by the UE, the method comprising:
  upon sensing access to the location information about the UE by an application operating in an operating system (OS) of the UE, matching a rule defining access authorization of the application to the location information;
  determining whether to allow or deny access of the application to the location information based on the access authorization; and
  in an absence of the matched rule, displaying a notification indicating an attempt of the application to access the location information.

11. The method of claim 10, further comprising in a presence of the rule, allowing or denying the access of the application to the location information according to the rule.

12. The method of claim 10, further comprising, upon input of a user selection of the notification, outputting a query screen asking whether to allow or deny the access of the application to the location information.

13. The method of claim 12, wherein the query screen includes a selection menu for at least one of location information, time information, event information, application state information, and UE state information as additional information for use in generating a rule defining whether to allow or deny the access of the application to the location information.

14. The method of claim 13, further comprising, when a user selects at least one piece of additional information, generating the rule as a condition that both selected additional information and identification information about the application should be satisfied.

15. The method of claim 10, further comprising, upon input of a user selection for the notification, outputting a map screen including an icon indicating a current location of the UE.

16. The method of claim 15, wherein the map screen displays a location information access history of the application using at least one icon.

17. The method of claim 15, further comprising, upon input of a user selection of at least one icon on the map screen, outputting a screen for setting permission or denial for access of the application to location information, for a point indicated by at least one icon.

18. The method of claim 17, wherein the screen includes a selection menu for at least one of location information, time information, event information, application state information, and UE state information as additional information for use in generating a rule defining whether to allow or deny access of the application to location information, for a point indicated by the at least one icon.

* * * * *